(12) United States Patent
Lee et al.

(10) Patent No.: US 7,848,120 B2
(45) Date of Patent: Dec. 7, 2010

(54) VOLTAGE-SOURCED HVDC SYSTEM WITH MODULATION FUNCTION

(75) Inventors: Jung Seok Lee, Daejeon (KR); Chan Ki Kim, Daejeon (KR); Noh Hong Kwak, Daejeon (KR); Jae Won Chang, Daejeon (KR); Seok Jin Lee, Seoul (KR); Hyoung Bae Moon, Seoul (KR)

(73) Assignee: Korea Electric Power Corporation, Seoul (KR)

( * ) Notice: Subject to any disclaimer, the term of this patent is extended or adjusted under 35 U.S.C. 154(b) by 123 days.

(21) Appl. No.: 12/365,813

(22) Filed: Feb. 4, 2009

(65) Prior Publication Data

US 2010/0177541 A1 Jul. 15, 2010

(30) Foreign Application Priority Data

Dec. 5, 2008 (KR) .................. 10-2008-0123046

(51) Int. Cl.
*H02J 3/36* (2006.01)
(52) U.S. Cl. .......................... 363/35; 363/36
(58) Field of Classification Search .............. 363/35, 363/36, 37
See application file for complete search history.

(56) References Cited

U.S. PATENT DOCUMENTS

| | | | | |
|---|---|---|---|---|
| 4,307,442 A | * | 12/1981 | Yano et al. | ..... 363/51 |
| 4,600,981 A | * | 7/1986 | Sakai et al. | ..... 363/35 |
| 4,638,415 A | * | 1/1987 | Neupauer | ..... 363/35 |
| 6,400,585 B2 | * | 6/2002 | Jiang-Hafner | ..... 363/35 |
| 6,531,843 B2 | * | 3/2003 | Iwaji et al. | ..... 318/727 |
| 7,471,525 B2 | * | 12/2008 | Suzuki et al. | ..... 363/37 |

FOREIGN PATENT DOCUMENTS

| | | |
|---|---|---|
| JP | 07-231649 | 8/1995 |
| JP | 10-023756 | 1/1998 |
| JP | 2002-034257 | 1/2002 |
| KR | 10-2001-0038845 | 5/2001 |
| KR | 10-2005-0046890 | 5/2005 |
| KR | 10-2005-0068310 | 7/2005 |
| KR | 10-2008-0004713 | 1/2008 |

* cited by examiner

*Primary Examiner*—Shawn Riley
(74) *Attorney, Agent, or Firm*—Martine Penilla & Gencarella, LLP

(57) ABSTRACT

A voltage-sourced High-Voltage Direct Current (HVDC) apparatus, which converts 3-phase AC voltage from a 3-phase AC power source into high voltage DC through a rectifier including switching elements, is provided. In the apparatus, a rectifier controller receives detected 3-phase currents, apparent power, and active power and generates D and Q-axis signals. A D/Q controller receives the signals and generates active power D-axis signal and apparent power Q-axis signal. A PWM unit generates PWM on/off signals for turning on/off the switching elements based on output signals from the D/Q controller. The D/Q controller includes a rotary converter to convert the D and Q-axis signals into AC signals and D and Q-axis order units coupled thereto, and generates the D and Q-axis signals through the order units. The PWM unit converts the D and Q-axis signals into 3-phase AC signals and compares them with 3-phase triangular waves to generate on/off signals for turning on/off the switching elements.

3 Claims, 4 Drawing Sheets

VOLTAGE-SOURCED HVDC SYSTEM WITH MODULATION FUNCTION

CLAIM OF PRIORITY

The present application is claiming foreign priority of Korean Patent Application No. 10-2008-0123046, filed on Dec. 5, 2008, the content of which is incorporated herein by reference.

BACKGROUND OF THE INVENTION

1. Field of the Invention

The present invention relates to a voltage-sourced HVDC system having a modulation function, and more particularly to a PWM-based voltage-sourced HDVC device.

2. Description of the Related Art

In a High-Voltage Direct Current (HVDC) scheme among DC power transmission schemes, AC power generated by a power plant is converted into DC power and the DC power is transmitted to a power receiving side which receives and converts the transmitted DC power back into AC power and supplies the AC power. This power transmission scheme enables economical power transmission through voltage boosting, which is an advantage of the conventional AC power transmission technology, while overcoming a number of problems of AC power transmission.

Such an HVDC scheme can be classified into a current-sourced HVDC scheme that uses a thyristor and an HVDC scheme that uses an IGBT or GTO. The current-sourced HVDC scheme is suitable for large-capacity power transmission and the voltage-sourced HVDC scheme is suitable for small-capacity power transmission or grid stabilization due to high loss. The voltage-sourced HVDC scheme can be classified into a phase control scheme and a PWM scheme according to driving method. While the phase control scheme is similar to the current-sourced scheme, the phase control scheme has a self-communicated function.

FIG. 1 is a schematic block diagram of a voltage-sourced HVDC system. In FIG. 1, reference numeral 11 denotes a rectifier that converts AC to DC, reference numeral 12 denotes an inverter that converts DC to AC. In FIG. 1, reference numerals 13 and 14 denote a general AC grid.

SUMMARY OF THE INVENTION

The present invention suggests a control algorithm for a PWM voltage-sourced HVDC control scheme. This control algorithm is a combination of a conventional PWM converter control scheme with a grid-control algorithm used in a conventional current-sourced HVDC control scheme. The present invention also suggests a PWM voltage-sourced HVDC control apparatus using the control algorithm to achieve both the advantage of the grid-control algorithm of the current-sourced HVDC scheme and the fast response properties of the PWM converter control scheme.

In accordance with the present invention, the above and other objects can be accomplished by the provision of a voltage-sourced High-Voltage Direct Current (HVDC) apparatus that converts a 3-phase AC voltage generated by a 3-phase AC power source into high voltage DC through a rectifier including switching elements. This apparatus may include a sensor unit that detects 3-phase currents, apparent power, and active power from the 3-phase AC voltage generated by a 3-phase AC power source; a rectifier controller that receives the detected 3-phase currents, apparent power, and active power and generates a D-axis signal and a Q-axis signal; a D/Q controller that receives the D-axis signal and the Q-axis signal from the rectifier controller and generates active power D-axis signal Idref and apparent power Q-axis signal Iqref; and a PWM unit that generates a PWM on/off control signal for turning on/off the switching elements based on output signals from the D/Q controller. Here, the D/Q controller may include a rotary converter to convert the D-axis and Q-axis signals into an AC signal and a D-axis order unit and Q-axis order unit coupled to the rotary converter, and the D/Q controller may generate the active power D-axis signal Idref and the apparent power Q-axis signal Iqref through the D-axis order unit and the Q-axis order unit. The PWM unit may convert the active power D-axis signal Idref and the apparent power Q-axis signal Iqref into 3-phase AC signals Ia, Ib, and Ic through a 2/3-phase converter and may compare the 3-phase AC signals with 3-phase triangular waves to generate an on/off control signal for turning on/off the switching elements.

According to an embodiment of the present invention, the D-axis order unit may include active power controller, an automatic DC voltage regulator, and a selection gate that selects one of outputs of the active power controller and the automatic DC voltage regulator and an output of the selection gate may be used as the active power D-axis signal Idref.

In addition, the Q-axis order unit may include a grid voltage controller, apparent power controller, and a selection gate that selects one of outputs of the grid voltage controller and the apparent power controller and an output of the selection gate may be used as the apparent power Q-axis signal Idref.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

A voltage-sourced HVDC apparatus employing a PWM scheme according to preferred embodiments of the present invention will now be described in detail with reference to the accompanying drawings.

Figure 1:
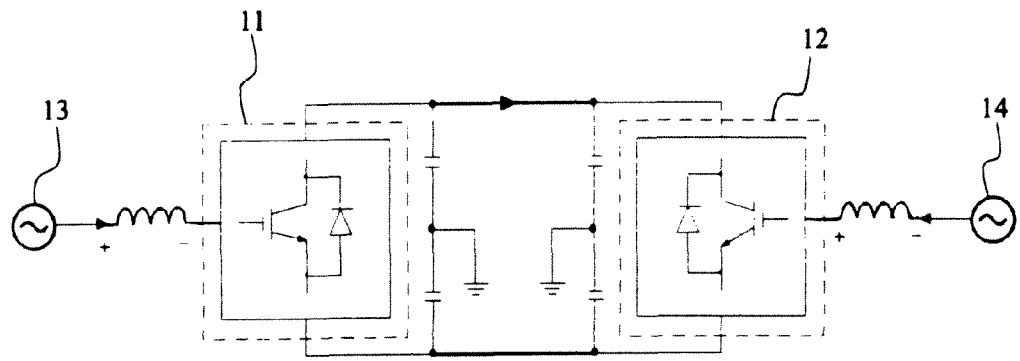
FIG. 1 is a schematic diagram of a conventional voltage-sourced HDVC device.
Figure 2:
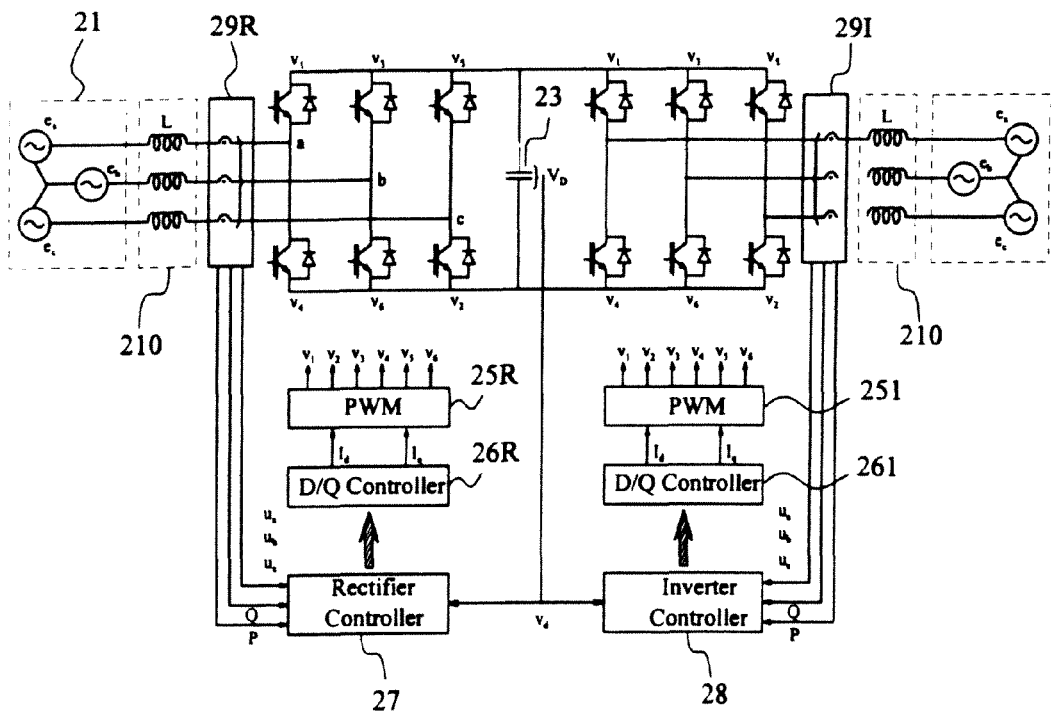
FIG. 2 is a PWM-based voltage-sourced HDVC device according to the present invention.

FIG. 2 illustrates detailed circuitry of a voltage-sourced HVDC system. The main difference between the voltage-sourced HVDC system and a general current-sourced HVDC system is that the voltage-sourced HVDC system uses an IGBT that allows on/off control.

As shown in FIG. 2, the voltage-sourced HDVC device employing a PWM scheme according to the present invention includes a rectifier controller 27 and an inverter controller 28.

In FIG. 2, reference numeral "21" denotes a power supply at the secondary side of a general or grid-connected transformer. The HDVC device of the present invention further includes a rectifier-side sensor 29R and an inverter-side sensor 29I. The rectifier-side sensor 29R measures 3-phase currents, apparent power, and active power from the power source 21. The inverter-side sensor 29I measures 3-phase currents, apparent power, and active power from an output of the inverter portion.

In FIG. 2, a symbol "L" in a transformer 210 denotes reactance or inductance for voltage boosting and reference numeral "23" denotes a capacitor for rectifying an AC voltage to a DC voltage. In addition, reference numerals 26R and 26I each denote a D/Q controller and reference numerals 25R and 25I each denote a PWM unit.

As shown in FIG. 2, the rectifier controller 27 receives 3-phase currents $u_a$, $u_b$, and $u_c$, apparent power, and active power from the rectifier-side sensor 29R and generates a D-axis signal to control the active power and a Q-axis signal to control the apparent power. These two signals are applied to the D/Q controller 26R coupled to the rectifier controller 27 and are then converted into an AC D-axis signal and an AC Q-axis signal that are phase-synchronized with the grid. Then, the AC D-axis and Q-axis signals are input to the PWM unit 25R coupled to the D/Q controller 26R and are then converted into 3-phase signals. The 3-phase signals are then applied to an on/off control circuit that controls rectifying elements $V_1$, $V_2$, $V_3$, $V_4$, $V_5$, and $V_6$ included in a corresponding rectifying portion as shown in FIG. 2.

The inverter controller 28 operates in a manner similar to the rectifier controller 27. The inverter controller 28 receives 3-phase currents $u_a$, $u_b$, and $u_c$, apparent power, and active power from the inverter-side sensor 29I and applies the 3-phase currents, the apparent power, and the active power to an on/off control circuit that controls rectifying elements $V_1$, $V_2$, $V_3$, $V_4$, $V_5$, and $V_6$ included in a corresponding rectifying portion through the D/Q controller 26I and the PWM unit 25I.

Figure 3:
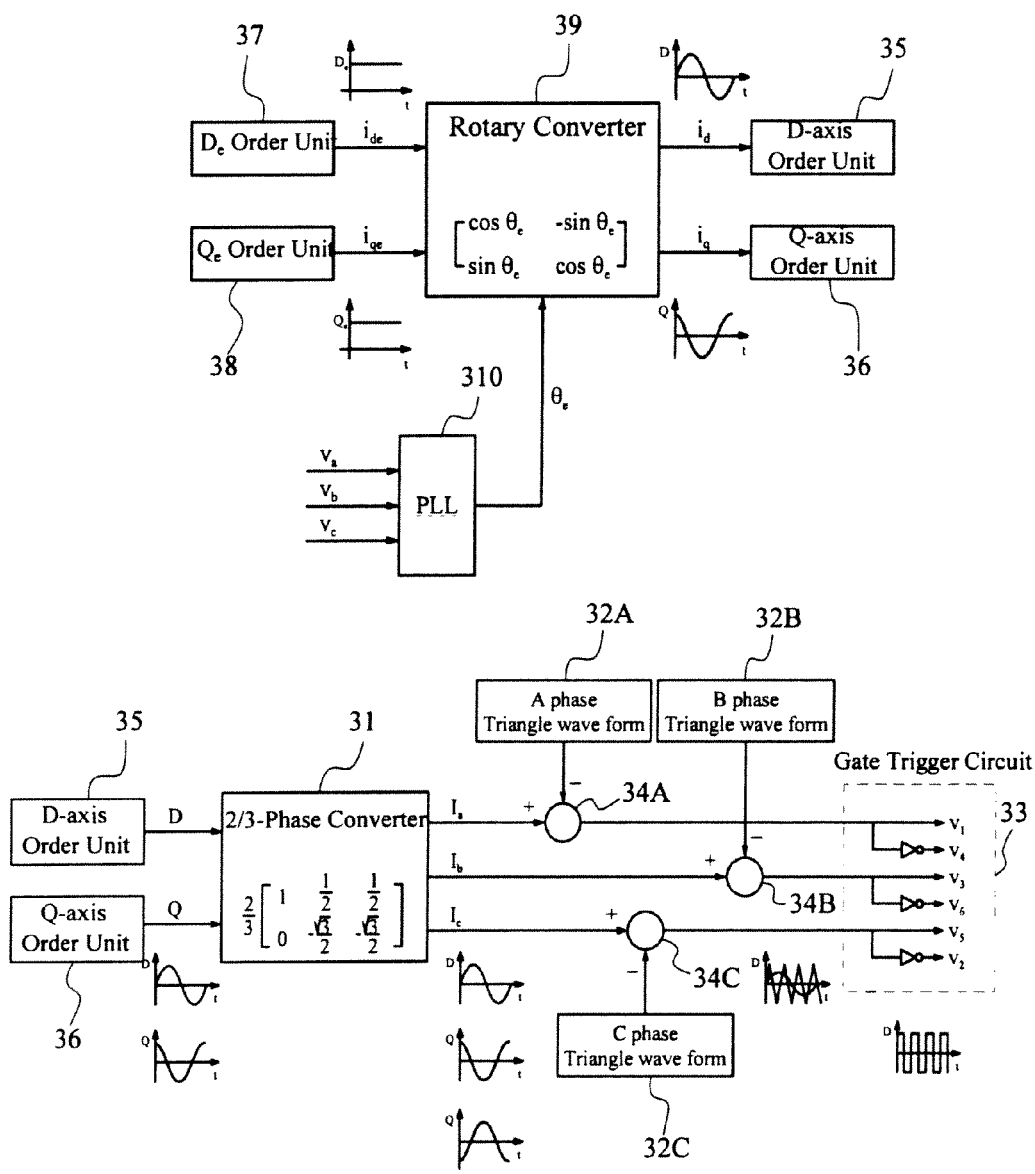
FIG. 3 is a detailed block diagram of a D/Q controller and a PWM unit shown in FIG. 2.

FIG. 3 is a more detailed block diagram illustrating the D/Q controller 26R or 26I shown in FIG. 2.

As shown in the upper side of FIG. 3, in the D/Q controller 26R, signals from a Qe-axis order unit 38, which corresponds to apparent power order unit, and a De-axis instructor 37, which corresponds to active power order unit, are converted into rotating AC signals through a rotary converter 39. In order to convert 2-phase signals into rotating AC signals, an angle signal produced through a Phase Lock Oscillator (PLL) 310 is input to the rotary converter 39. The Qe-axis order unit 38 and the De-axis instructor 37 are simple circuits that may contain order and feedback data and include a controller.

Then, as shown in the lower side of FIG. 3, in the PWM units 25I and 25R of FIG. 2, 2-phase AC signals D and Q output from a D-axis order unit 35 and a Q-axis order unit 36 are converted into 3-phase AC signals Ia, Ib, and Ic through a 2/3-phase converter 31. The 3-phase signals Ia, Ib, and Ic output from the 2/3-phase converter 31 are input respectively to comparators 34A, 34B, and 34C that are coupled respectively to triangular wave generators 32A, 32B, and 32C. The 3-phase signals Ia, Ib, and Ic are compared with signals from the triangular wave generators 32A, 32B, and 32C, for example using the comparators 34A, 34B, and 34C, to generate on/off signals. The on/off signals turn on/off an IGBT(s) through the gate on/off control (or trigger) circuit 33.

Figure 4:
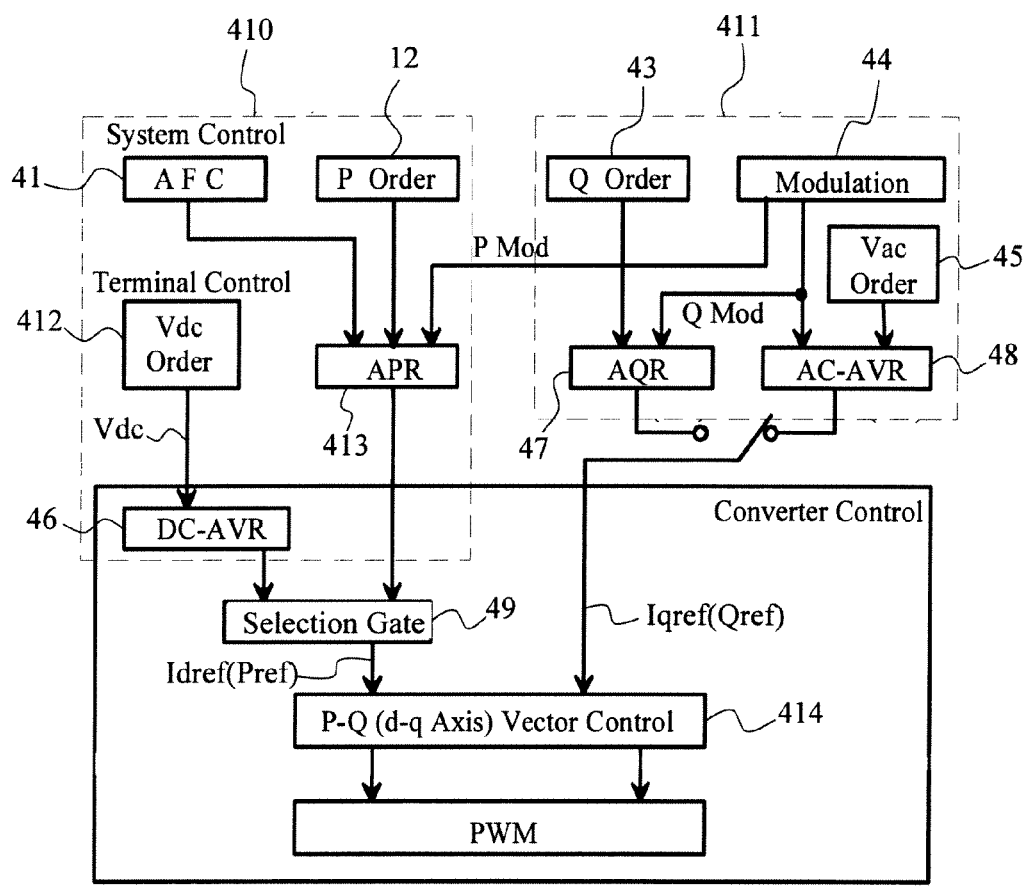
FIG. 4 is a block diagram illustrating a configuration of a D/Q order unit of FIG. 3.

FIG. 4 is a block diagram illustrating the configuration of a control circuit for generating a D-axis signal, which is active power order signal, and a Q-axis signal, which is apparent power order signal.

As shown in FIG. 4, the control circuit for generating order signals includes active power order signal generation control block 410 that generates active power order signal and apparent power order signal generation control block 411 that generates apparent power order signal.

The active power order signal generation control block 410 includes an Auto Frequency Controller (AFC) 41 that detects the grid frequency and performs frequency control, a power order unit 42 that performs power control, a DC voltage controller 412 that controls the DC voltage of the converter, active power controller (or Auto Power Regulator (APR)) 413 that controls active power at a desired level, and an automatic DC voltage regulator 46. The APR 413 is coupled to the AFC 41 and the power order unit 42. A signal output from the active power controller (APR) 413 and a signal output from the automatic DC voltage regulator 46 are transmitted to a selection gate 49. The selection gate 49 selects one of the two output signals and outputs the selected signal as active power order D-axis signal Idref.

On the other hand, the control block 411 which controls the apparent power may include apparent power order value generator 43, a refined signal regulator 44, a grid voltage controller 45, an automatic apparent power controller 47, and an automatic AC voltage regulator 48 which is a grid voltage controller. One of a signal output from the apparent power controller 47 and a signal output from the automatic AC voltage regulator 48 is output as apparent power order Q-axis signal Iqref.

As described above, the active power order D-axis signal Idref and the apparent power order Q-axis signal Iqref are input to a P-Q (d-q axis) vector controller 414 and are then converted into a D-axis signal and a Q-axis signal, respectively, as shown in FIG. 4. The two converted signals are then input to the PWM units 25I and 25R (see FIG. 2).

Figure 5:
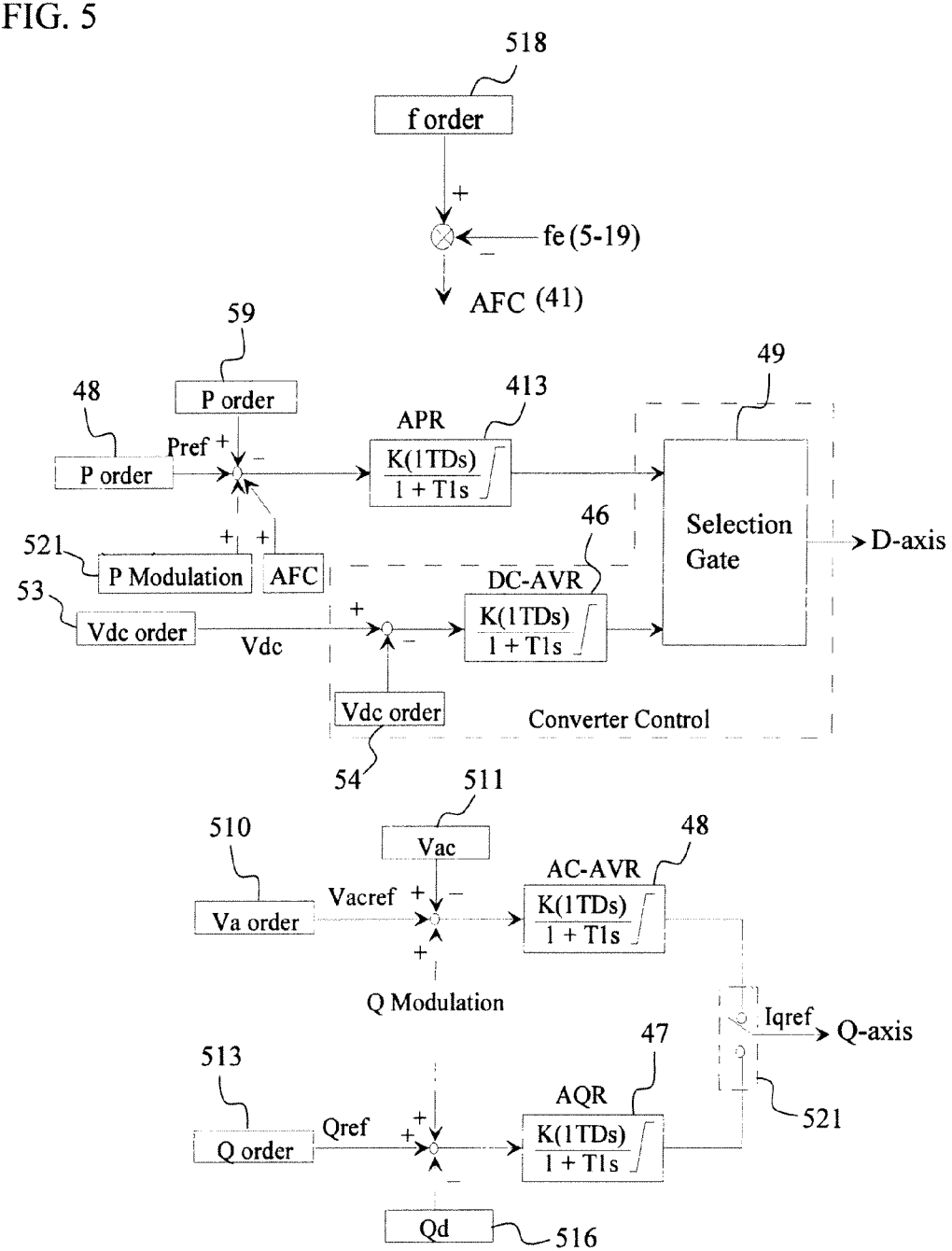
FIG. 5 is a more detailed block diagram illustrating an embodiment of the voltage-sourced HVDC controller according to the present invention shown in FIG. 4.

FIG. 5 is a more detailed block diagram illustrating an embodiment of the voltage-sourced HVDC controller according to the present invention shown in FIG. 4. Specifically, FIG. 5 illustrates control signals produced by the active power order signal generation control block 410 employing the active power controller and the apparent power order signal generation control block 411 of FIG. 4 employing the apparent power controller.

In FIG. 5, active power order value 58 is compared with active power measured value 59 and the compared result is applied to the active power controller 413. In a preferred embodiment, the active power controller 413 may be implemented through PI control.

Here, in the case where there is a need to control grid frequency, an error frequency signal obtained by subtracting a grid frequency measured value 519 from a grid frequency order value 518 may be provided to the input of the active power controller 413.

In addition, in the case where the grid is unstable, active power correction signal 521 may be applied to the active power controller 413.

Since the DC voltage of the voltage-sourced HVDC controller also serves as active power, the DC voltage may also be input to the active power controller 413 such that the DC voltage order value 53 and the DC voltage measured value 54 may be input to the DC voltage controller 46.

Then, an output of the active power controller 413 and an output of the DC voltage controller 46 are input to a control selector (i.e., the selection gate 49) to generate active power signal. The configuration or setting of the control selector may vary according to grid conditions.

Then, in the apparent power order signal generation control block 411 shown at the lower side of FIG. 5, an error of a grid voltage order value 510 from a grid voltage measured value 511 is input to the grid voltage controller 48 or an error of apparent power order value 513 from apparent power measured value 516 is input to the apparent power controller 47 to generate apparent power Q-axis signal Iqref. A selector 521 is manually switched as needed.

The D-axis signal and the Q-axis signal generated in this manner are input to the PWM units 25I and 25R as shown in FIG. 2 or FIG. 4.

Since the HVDC system simultaneously controls the active power and the apparent power, the system can simultaneously control the grid voltage and frequency. The algorithm suggested in the present invention is also characterized that it can control the quality and harmonics of the grid.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A voltage-sourced High-Voltage Direct Current (HVDC) apparatus that converts a 3-phase AC voltage generated by a 3-phase AC power source into high voltage DC through a rectifier including switching elements, the apparatus comprising:
    a sensor unit that detects 3-phase currents, apparent power, and active power from the 3-phase AC voltage generated by a 3-phase AC power source;
    a rectifier controller that receives the detected 3-phase currents, apparent power, and active power and generates a D-axis signal and a Q-axis signal;
    a D/Q controller that receives the D-axis signal and the Q-axis signal from the rectifier controller and generates active power D-axis signal and apparent power Q-axis signal; and
    a PWM unit that generates a PWM on/off control signal for turning on/off the switching elements based on output signals from the D/Q controller,
    wherein the D/Q controller includes a rotary converter to convert the D-axis and Q-axis signals into an AC signal and a D-axis order unit and Q-axis order unit coupled to the rotary converter, and the D/Q controller generates the active power D-axis signal and the apparent power Q-axis signal through the D-axis order unit and the Q-axis order unit, and
    the PWM unit converts the active power D-axis signal and the apparent power Q-axis signal into 3-phase AC signals through a 2/3-phase converter and compares the 3-phase AC signals with 3-phase triangular waves to generate an on/off control signal for turning on/off the switching elements.

2. The voltage-sourced HVDC apparatus according to claim 1, wherein the D-axis order unit includes active power controller, an automatic DC voltage regulator, and a selection gate that selects one of outputs of the active power controller and the automatic DC voltage regulator and an output of the selection gate is used as the active power D-axis signal.

3. The voltage-sourced HVDC apparatus according to claim 1, wherein the Q-axis order unit includes a grid voltage controller, apparent power controller, and a selection gate that selects one of outputs of the grid voltage controller and the apparent power controller and an output of the selection gate is used as the apparent power Q-axis signal.

* * * * *